Dec. 3, 1946. J. NEUFELD 2,412,003
NAVIGATIONAL METHOD AND APPARATUS
Filed June 16, 1942
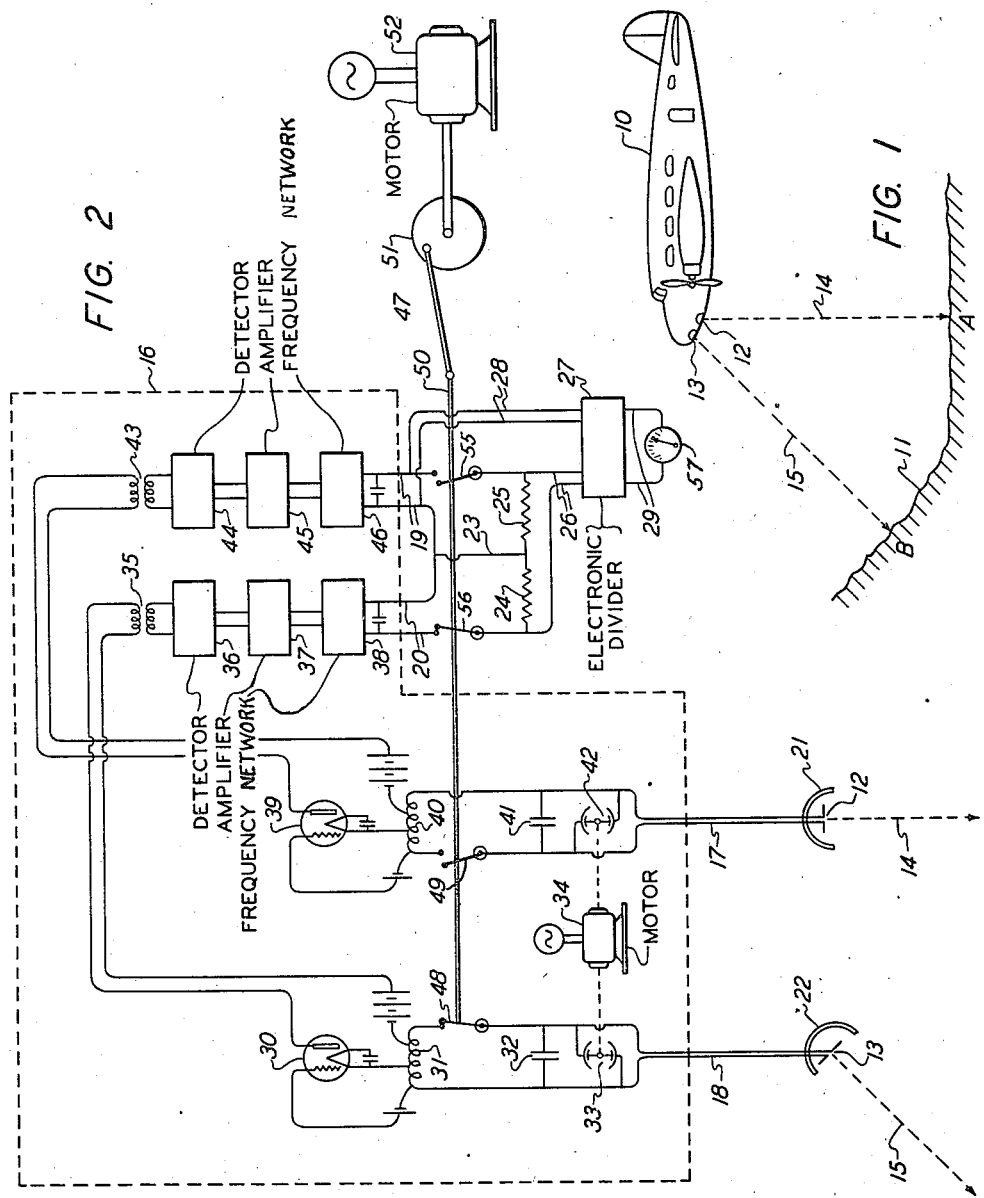
INVENTOR
Jacob Neufeld Patented Dec. 3, 1946

2,412,003

UNITED STATES PATENT OFFICE 2,412,003

NAVIGATIONAL METHOD AND APPARATUS

Jacob Neufeld, Tulsa, Okla.

Application June 16, 1942, Serial No. 447,241

14 Claims. (Cl. 250—1.50)

This invention relates to a novel radio contourmeter adapted for indicating the height of an aircraft directly above the terrain over which the aircraft is flying, and also the relative height of the aircraft with respect to the terrain in advance of the aircraft, whereby the pilot is given advance information as to whether the terrain he is approaching is ascending or descending, and may, therefore, control the elevation of his craft accordingly to avoid collision.

This invention also relates to distance and direction determining systems and is particularly concerned with means to be mounted on board of a vessel, an aircraft or other conveyance for projecting radio beams against either natural or artificial objects from which it may be reflected back to points adjacent the beam projectors, and further means for detecting the reflected beams and deriving from the reflected beams an index characterizing the terrain in advance of the aircraft.

My invention may be used either to avoid collisions between vessels or to determine the altitude at which an airplane may be flying. It is not however, limited to such uses.

While an absolute altimeter such as disclosed in U. S. Patents 2,045,071 and 2,045,072 issued to Lloyd Espenschied will give an accurate indication of the height of the craft above the ground, it does not give any indication of the nature of the terrain ahead of the craft and toward which the latter is heading, with the result that especially in hilly or mountainous regions during periods of poor visibility crashes are apt to occur due, for example, to the flying of a craft from a valley toward a mountain, the sudden change in contour of the terrain being too great for the craft to navigate safely without advance information being given the pilot.

The principal object of the present invention is to provide a novel instrument, termed a contourmeter, which will give the pilot of a craft advance information as to the nature of the terrain ahead so that he can maneuver his craft accordingly, whereby, for example, should there arise a mountain ahead too high to climb over, he will have an opportunity to turn to one side or the other and hence avoid a crash.

Another object of the present invention lies in the provision of a novel radio contourmeter that serves to give a continuous visual, accurate indication on an instrument face of the height of the craft directly above the earth and also the relative height of the craft with respect to the terrain in advance of the craft regardless of atmospheric conditions or visibility, the said contourmeter being of rugged, simple and compact nature especially adapting the same for use on aircraft.

Another object of the present invention consists in providing apparatus for distance and direction determining which may be conveniently mounted on board of a vessel for giving warning of the approach of another vessel, the presence of an iceberg, reef, or any dangerous object.

Other objects and advantages will become apparent from the specification, taken in connection with the accompanying drawing wherein the invention is embodied in concrete form.

In the drawing:

Fig. 1 is a schematic view in elevation, illustrating an aircraft equipped with the present contourmeter.

Fig. 2 shows diagrammatically the structure of the contourmeter.

Referring now to Fig. 1 the numeral 10 designates an aircraft flying over a terrain 11. The aircraft is provided with two directional transmitter-receiver antennas which are respectively designated by numerals 12 and 13; the transmitter-receiver antenna 12 is directed straight downwardly and the transmitter-receiver antenna 13 is directed forwardly and downwardly at any desired angle with the vertical, such, for example, as 60°. The directions along which the radiation beams are projected from antennas 12 and 13 are designated by lines 14 and 15 respectively. Points A and B designate intersections of the lines 14 and 15 with the ground. It is apparent that because of the conductivity and of the irregularity of the earth surface below the aircraft, any electromagnetic wave transmitted from the aircraft towards the earth becomes reflected and scattered by the earth surface. Consequently, when the transmitter-receiver antenna 12 transmits electromagnetic waves along the downward direction or when the transmitter-receiver antenna 13 transmits electromagnetic waves along the direction determined by the angle of 60 degrees, a portion of the transmitted electromagnetic waves becomes reflected and scattered by the earth surface and a portion of the reflected or scattered energy becomes detected by the corresponding receiver antenna located in the aircraft.

Referring now particularly to Fig. 2, the part of the arrangement included into the dotted line 16 designates a network having two pairs of input terminals 17 and 18 and two pairs of output terminals 19 and 20. The input terminals are connected to dipole aerials 12 and 13 respectively, the said aerials being located in the foci of parabolic reflectors 21 and 22 respectively. The parabolic reflector 21 is directed downwardly in the direction 14 and the parabolic reflector 22 is directed forwardly and downwardly at an angle of 60° with the vertical in the direction of the line 15.

Consider now the electrical network contained in the dotted line 16. This electrical network combined with the antennas 12, 13 and projectors 21, 22 constitutes a distance determining system. The distance determining system is adapted to produce across the output terminals 19 a voltage representing the distance from the aerial 12 to the point A on the ground and provides also across its output terminals 20 a voltage representing the distance from the aerial 13 to the point B on the ground.

The voltages derived from the output terminals 19 and 20 are applied to a differential network 23 which is controlled by a switching system 47 comprising switches 55 and 56. The switch 55 is adapted to connect to or to disconnect the terminals 19 from the resistor 25 and the switch 56 is adapted to connect to or to disconnect the terminals 20 from the resistor 24. The operating arms of the switches 55 and 56 are linked by a rod 50 which is given a reciprocating motion by a crank and connecting rod arrangement 51, which is, in turn driven by motor 52. Because of the reciprocating motion of the rod 50, the switches 55 and 56 are made to insert alternately and repeatedly the output voltages derived from the terminals 19 and 20 across resistors 25 and 24 respectively. These two voltages are inserted into a differential network 23 in such a manner that they oppose each other. The alternate process of closing and opening of the switches 55 and 56 has been made sufficiently rapid so as to produce across the output terminals 26 a voltage that indicates substantially the difference of the voltages derived from the resistors 24 and 25.

Assume now that the earth contour 11 is horizontal and the direction of 15 is inclined at 60°. Then the distance of the plane to the point B will be twice as large as the distance to the point A. Consequently, in case of a horizontal terrain the voltage across the terminals 20 is twice as large as the voltage across 19. These two voltages are inserted into a differential network 23 in such a manner that they oppose each other. The values of the resistors 24 and 25 in the network 23 have been so selected that the voltage across the terminals 26 is zero if the input voltage across 20 is twice as large as the voltage across 19. Also the voltage across 26 is positive if the voltage across 20 exceeds the double of the voltage across 19, and the voltage across 26 is negative if the voltage across 20 is below the double of the voltage across 19.

It is, therefore, apparent that the voltage across the terminals 26 indicates the difference in elevation between the points A and B. This voltage is zero in case the terrain is horizontal; it is positive in case the contour of the earth is falling and it is negative in case the contour of the earth is rising.

It is apparent that the magnitude of the voltage across 26 apprises the pilot of the conditions of the terrain. However, it does not supply him with sufficient information regarding the safety of his flight. Thus, for instance, if the aircraft is very high above the ground a large value of voltage across the terminals 26 is permissible without causing any danger of collision. On the other hand, if the aircraft is very low above the ground a small voltage across the terminals 26 may indicate warning of a dangerous condition. Therefore, it is necessary to provide a safety index which will apprise the pilot of the difference in level conditions and its relationship to the altitude of the aircraft. Accordingly an index is provided which expresses the ratio of the difference between the levels of A and B to the altitude of the aircraft.

The above referred to safety index is obtained by means of an electronic divider 27. The electronic divider is adapted to produce across its output terminals a voltage representing the ratio of voltages applied to its input terminals and it may be of the type described in the U. S. Patent 2,129,880 issued to Jacob Neufeld on September 13, 1938. The electronic divider 27 is provided with two pairs of input terminals 26 and 28 respectively and one pair of output terminals 29. The input terminal 26 receives the voltage representing the difference between the elevations of A and B, the input terminal 28 receives the voltage representing the altitude of the aircraft. Consequently, the voltage across the output terminals 29 represents the safety index which corresponds to the ratio of the two input voltages. A meter 57 is connected across said output terminals 29 and provides a visual indication of said safety index.

It is, therefore, apparent that I have provided an index apprising the pilot of the nature of the terrain ahead of the aircraft.

Consider now the electrical network included in the rectangle 16 which, together with the antennas 12, 13 constitutes a distance determining system in two different directions, i. e., for determining distances from the craft to the points A and B respectively, the said points A and B being located on the ground. One of the said distances is determined by utilizing the waves emitted from the antenna 12 in the downward direction 14. These waves become reflected or scattered by the earth's surface at the point A back to the craft and by determining the time interval between the radiation and the reception we can determine the distance from the craft to the point A. To illustrate my invention I will use the method of measuring time intervals described in the U. S. Patent 2,045,071 according to which the time delay is measured by combining the received, reflected or scattered waves with the waves generated for transmission, whereby a resultant current is set up in an indicating device. Thus, I am able to indicate the distance from the plane to the earth along the direction 14.

In a similar manner the waves transmitted from the antenna 13 provide an indication of the distance from the aircraft to the earth along the direction 15.

The current to the antenna 13 is being supplied from a tube 30 which functions as a combined oscillator and detector, its input and output circuit being coupled by the inductance 31, which inductance forms part of the tuned circuit. That circuit also includes a fixed condenser 32 and a variable condenser 33, which, by virtue of its connection with the shaft of the motor 34 is capable of varying continuously the amount of capacity in the tuned circuit, and, consequently, continuously varies the frequency of the transmitter. The output of the transmitter is connected through a coaxial transmission line to a half wave dipole antenna 13 which is mounted below the reflector 22. The output circuit of the tube 30 is connected through the transformer 35 to the detector 36, the output of which is connected to the amplifier 37. The output of 37 is connected to a block 38 containing a network that shall be designated as "frequency network." The frequency network 38 may be of the type providing across its output terminals a voltage proportional to the frequency of the current applied to the input terminals. A frequency network that can be used in connection with this invention is well known in the art (see for instance U. S. Patent 2,232,858 issued to R. F. Lane on February 25, 1941). The output terminals of the frequency network 38 are designated by the numeral 20.

In a similar manner the current to the antenna 12 is being supplied from a tube 39 which functions as a combined oscillator and detector, its input and output circuit being coupled by the inductance 40, which inductance forms part of the tuned circuit. That circuit also includes a fixed condenser 41 and a variable condenser 42, which, by virtue of its connection with the shaft of the motor 34 is capable of varying continuously the amount of capacity in the tuned circuit, and, consequently, continuously varies the frequency of the transmitter. The output of the transmitter is connected through a coaxial transmission line to a half wave dipole antenna 12 which is mounted below the reflector 21. The output circuit of the tube 39 is connected through the transformer 43 to the detector 44, the output of which is connected to the amplifier 45. The output of 45 is connected to a block 46 containing a network similar to the frequency network 38. The frequency network 46 is of the type providing across its output terminals a voltage proportional to the frequency of the current applied to the input terminals. The output terminals of the frequency network 46 are designated by the numeral 19.

The operation of this device involves the well known principle of measuring distances described in U. S. Patents 2,045,071 and 2,045,072 issued to Lloyd Espenschied, 2,206,896 issued to W. H. C. Higgins et al. and 2,206,903 issued to R. F. Lane et al. According to this principle the distance is measured by radiating waves from one point to another and receiving the waves reflected back at the first point. The time interval between radiation and reception is a measure of the distance and is determined by cyclically varying the frequency of the transmitted waves at a known rate and over a known range. The frequency difference between the wave being transmitted and the received reflected wave is, therefore, a measure of the distance to the reflecting surface. The measurements are obtained by beating together the transmitted wave and the echo wave and measuring the frequency of the resultant difference frequency beat wave.

In the operation of the arrangement shown in Fig. 2, the waves of continuously varying frequency are radiated by the antenna 13, which waves, after being reflected or scattered by the earth are again received by the said antenna 13. The directly transmitted and reflected or scattered signal components are applied to the detector 36 where they combine to produce a useful demodulation product which is a signal whose instantaneous frequency is equal to the instantaneous difference in the frequency of the two component waves. This difference frequency product is amplified in the amplifier 37 and its frequency is measured and indicated by the frequency network 38. The average value of the frequency difference is a direct measure of the distance between the measuring apparatus and the reflecting surface, along the inclined directional axis designated by 15.

In a similar manner the waves of continuously varying frequency are radiated by the antenna 12, which waves, after being reflected by the earth are again received by the said antenna 12. The directly transmitted and reflected signal components are applied to the detector 44 where they combine to produce a useful demodulation product which is a signal whose instantaneous frequency is equal to the instantaneous difference in the frequency of the two component waves. This difference frequency product is amplified in the amplifier 45, and its frequency is measured and indicated by the frequency network 46. The average value of the frequency difference is a direct measure of the distance between the measuring apparatus and the reflecting surface along the vertical directional axis designated by 14.

The antennas 12 and 13 are alternately and repeatedly connected to the inductances 31 and 40 by means of switches 49 and 48 respectively. The operation of the switches 49 and 48 is effected by means of the rod 50 referred to above and made simultaneous with the operation of the switches 55 and 56. Consequently, the switches 48 and 56 are simultaneously closed while the switches 49 and 55 are simultaneously opened and vice versa. It is apparent, that at the time interval when the switches 48 and 56 are closed the antenna 13 transmits the wave in the direction 15, and receives the wave reflected from the ground. Then the transmitted and the reflected waves are combined in the detector 36 and the beat frequency signal derived from the detector 36 is amplified in 37, and applied to the frequency network 38. The output of the frequency network 38 becomes subsequently transmitted through the switch 56 to the resistor 24 and produces a voltage across the terminals of the resistor 24. After a relatively short time interval the rod 50 changes its position so as to disconnect the switches 48 and 56 and closes the switches 49 and 55. Then the antenna 12 transmits a wave in the direction 14 and receives the wave reflected from the ground. Both waves are combined in the detector 44 and the beat frequency signal derived from the detector 44 is amplified in 45 and applied to the frequency network 46. The output of the frequency network 46 becomes subsequently transmitted through the switch 55 to the resistor 25 and produces a voltage across the terminals of the resistor 25. The time interval during which the switches 48 and 56 are open is made sufficiently short so as not to allow the voltage across the resistor 24 to decay. Consequently, we may assume that during this time interval the voltage across the resistor 24 has not departed from its original value and therefore we obtain across the terminals 26 a voltage which represents the difference of voltages derived from the resistors 24 and 25.

I claim:

1. A radio contourmeter for aircraft, comprising a transmitting means for transmitting directionally waves downwardly, another transmitting means for transmitting directionally waves in advance of the aircraft, means responsive to the first said waves and to the waves resulting from the reflection of the first said waves from the earth for producing a signal representing the distance from the aircraft to the earth in the downward direction, means responsive to the second said waves and to the waves resulting from the reflection of the second said waves from the earth and for producing a signal representing the distance from the aircraft to the earth in advance of the aircraft, and means responsive to said signals for producing a current, the magnitude of said current representing a definite relationship between the magnitudes of said signals.

2. A system for investigating the surroundings in the neighborhood of an indicating station, comprising two systems for producing two signals representing respectively distances along selected directions from said station to selected portions of said surroundings, a receiver for receiving successively said signals, said receiver being capable of retaining simultaneously said signals if received successively within a determined time interval, two switches respectively connected to the outputs of said two systems and to the input of said receiver for individually transmitting said signals from each of said systems to said receiver, and means for alternately and recurrently operating said switches at a frequency which is a function of said time interval.

3. A system for investigating surroundings comprising wave reflecting objects in the neighborhood of an indicating station, comprising means in said indicating station for producing frequency modulated waves, a directional transmitter connected to said means for transmitting said frequency modulated waves towards said surroundings along two selected directions, means responsive to a portion of said transmitted waves and to a portion of the waves reflected by said objects for producing two signals representing respectively frequency differences between said transmitted waves and said waves returned by said surroundings along said two directions, and a means responsive to said signals for producing a resultant current having a magnitude that represents a relationship therebetween.

4. An arrangement for investigating the surroundings in the neighborhood of an observing station, comprising at least two systems for producing output currents having magnitudes representing distances from said observing station to selected portions of said surroundings, said systems having directional properties that are distinguishable one from the other and fixed with respect to time, whereby the currents produced by said systems represent distances along the directions that are related to said properties, an indicator, and a switching mechanism for connecting interchangeably and recurrently the outputs of each of said systems to said indicator.

5. An arrangement for investigating the surroundings in the neighborhood of an observing station, comprising at least two systems for producing output currents having magnitudes that are substantially proportional to distances from said observing station to selected portions of said surroundings, said systems having directional properties that are distinguishable one from the other and fixed with respect to time whereby the currents produced by said systems are substantially proportional to distances along the directions that are related to said properties, an indicator, and a switching mechanism for connecting interchangeably and recurrently the outputs of each of said systems to said indicator.

6. An arrangement for investigating the surroundings in the neighborhood of an observing station, comprising at least two systems for producing currents having magnitudes representing distances from said observing station to selected portions of said surroundings, said systems having directional properties that are distinguishable one from the other and fixed with respect to time, whereby the currents produced by said systems represent distances along the directions that are related to said properties, and means responsive to said distance representing currents for producing a resultant current, said resultant current having a magnitude that represents a relationship between said distance representing currents.

7. A system for investigating the surroundings in the neighborhood of an observing station, comprising radio transmitting means located at said station and including directive antennas disposed to transmit radio waves in selected directions from said station into said surroundings and to receive radio waves reflected by portions of said surroundings that correspond to said directions, means responsive to a portion of said transmitted radio waves and to a portion of said reflected radio waves to produce signals, each of said signals representing a relationship between a wave transmitted along a said selected direction and a corresponding reflected wave, and means responsive to said signals for producing a current, the magnitude of said current representing a relationship between the magnitudes of said signals.

8. A system for investigating surroundings comprising wave reflecting objects in the neighborhood of an observing station, comprising transmitter-receiver located at said station for simultaneously transmitting frequency modulated radio waves to selected portions of said surroundings along at least two different directions and to simultaneously receive frequency modulated radio waves reflected by said objects comprised in said selected portions, means rsponsive to a portion of said transmitted radio waves and to a portion of said reflected radio waves to produce signals, each of said signals representing frequency difference between a transmitted wave and a corresponding reflected wave, and means responsive to said signals for producing a current, the magnitude of said current representing a relationship between the magnitudes of said signals.

9. An arrangement for investigating the surroundings in the neighborhood of an observing station, comprising a system located in said observing station for producing individual signals representing distances from said station to various objects in said surroundings, means responsive to said individual signals for producing a resultant current having a magnitude that represents a determined relationship between the magnitudes of said individual signals, and a switching mechanism connected to said system and to said means for applying interchangeably and recurrently said individual signals to said means.

10. An arrangement for investigating surroundings in the neighborhood of an observing station, said surroundings containing objects adapted to reflect energy waves, comprising a controllable system of variable directivity located at said observing station for transmitting energy waves toward said objects along directions related to said directivity, said system comprising a variable control element determining its directivity, means connected to said system and responsive to a portion of said transmitted waves and to a portion of the waves reflected by said objects for producing signals representing a relationship between said transmitted and reflected waves, a control element connected to said system for alternately and recurrently varying its directivity by means of said element from one determined value to another determined value thereby causing said system to produce alternately and recurrently two signals representing distances that correspond to said two values, an indicator, a switching device connected to said system and to said indicator for controlling the transfer of said signals to said indicator, and means for controlling said switching device and operated at a definite time relationship to said alternate and recurrent variations of directivity.

11. A system for investigating surroundings in the neighborhood of an observing station, said surroundings containing objects that are adapted to reflect waves, comprising means in said station for producing waves, a directional arrangement connected to said means for transmitting said waves towards said objects along two selected directions and receiving the waves reflected by said objects, a second means responsive to a portion of said transmitted waves and to a portion of said reflected waves for producing two signals corresponding to said two directions, respectively, a receiver for receiving successively said signals, said receiver being capable of retaining simultaneously said signals if received successively within a determined time interval, a switch mechanism comprising two separate channels and connected to the output of said second means and to the input of said receiver for individually and separately transmitting said signals from said output to said receiver along said channels, and means connected to said switch for alternately and recurrently energizing said channels at a frequency which is a function of said time interval.

12. Method of investigating surroundings comprising wave reflecting objects in the neighborhood of an indicating station by means of a receiver characterized by retentivity effect which causes two signals received successively within a predetermined time interval to be simultaneously retained, comprising the step of alternately and recurrently transmitting into said surroundings two beams of waves in accordance with a determined time sequence and along two different and fixed directions, receiving a portion of said transmitted beams and a portion of the beams reflected by said objects and producing in synchronism with said sequence two signals representing relationship between the transmitted and the received beams and corresponding to said two directions respectively, and applying said signals to said receiver, said time sequence having a determined relation to said time interval whereby said two signals are simultaneously retained.

13. The method of investigating surroundings comprising wave reflecting objects in the neighborhood of a reference point, comprising the step of projecting radiant energy in selected directions from said point to said surroundings, receiving the energy reflected by said objects, producing signals representing respectively distances from said point to said objects along said selected directions, and combining said signals in order to produce a current the magnitude of which represents a relationship between said signals.

14. In a method of investigating surroundings comprising wave reflecting objects in the neighborhood of a reference point, the step of projecting radiant energy from said point to said surroundings continually and interchangeably in selected directions and in accordance with a definite sequence, receiving the energy reflected by said objects, producing signals representing respectively distances from said point to said objects in the said selected directions, and combining said signals in order to produce a current the magnitude of which represents a relationship between said signals.

JACOB NEUFELD.